US006647000B1

(12) United States Patent
Persson et al.

(10) Patent No.: US 6,647,000 B1
(45) Date of Patent: Nov. 11, 2003

(54) METHODS AND APPARATUS FOR PERFORMING SLOT HOPPING OF LOGICAL CONTROL CHANNELS IN WIRELESS COMMUNICATIONS SYSTEMS

(75) Inventors: Bengt Persson, Djursholm (SE); Christofer Lindheimer, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/472,882

(22) Filed: Dec. 28, 1999

Related U.S. Application Data
(60) Provisional application No. 60/136,793, filed on May 28, 1999.

(51) Int. Cl.[7] .......................... H04Q 7/00; H04B 7/212; H04J 3/06
(52) U.S. Cl. .................... 370/330; 370/348; 370/350; 455/447
(58) Field of Search ................. 370/352–357, 370/343–345, 321, 330, 348, 337, 350, 329, 436, 458; 375/132; 455/447, 464, 450, 422

(56) References Cited

U.S. PATENT DOCUMENTS 5,404,376 A * 4/1995 Dent .......................... 375/200
5,537,434 A 7/1996 Persson et al.
5,844,894 A 12/1998 Dent .......................... 370/330
6,497,599 B1 * 12/2002 Johnson et al. ............. 445/447

FOREIGN PATENT DOCUMENTS

WO    WO97/12489    4/1997

OTHER PUBLICATIONS

ETSI TS 100 908 v.6.2.0 Digital Cellular Communication System (Phase 2+); "Multiplexing and multiple access on the radio path" (GSM 05.02 version 6.2.0 Release 1997).

* cited by examiner

Primary Examiner—Duc Ho

(57) ABSTRACT

A base station synchronized Time Division Multiple Access (TDMA) System with a discontinuous control channel carrier is disclosed. Control channels are planned in a time reuse, overlaying the ordinary frequency reuse. Different base stations are allocated different timeslots for control channel transmissions. The control channels are allocated timeslots in a slot hopping fashion, such that transmissions from different base stations are detected by only monitoring one timeslot. Thus, MAHO measurements are possible on all neighbors, and no traffic allocation will continuously coincide with control channel transmissions from certain base stations.

29 Claims, 5 Drawing Sheets

Fig. 5

METHODS AND APPARATUS FOR PERFORMING SLOT HOPPING OF LOGICAL CONTROL CHANNELS IN WIRELESS COMMUNICATIONS SYSTEMS

CROSS-REFERENCE TO RELATED APPLICATIONS

The present application claims priority to U.S. Provisional Application No. 60/136,793, entitled "Slot Hopping Communication System and Method" and filed May 28, 1999, which is incorporated herein in its entirety by reference.

FIELD OF THE INVENTION

The present invention generally relates to cellular and wireless communication. More specifically, the invention relates to a system and method for introducing a communication system in a low frequency reuse pattern.

BACKGROUND OF THE INVENTION

Recently, there has been a trend in the telecommunication community to focus more and more on wireless packet data communication rather than circuit switched voice communication. With the tremendous increase of Internet users, it is believed that the packet switched communication will soon increase more and become larger than the circuit switched voice communication that today dominates, e.g., the cellular communication. Cellular communication system manufacturers and operators are therefore looking for solutions to integrate their circuit switched services with wireless packet switched services that can provide reliable and more spectrum efficient connections for packet switched users, e.g., Internet users. This trend has made different types of packet switched communication system evolutions flourish. One of the more well known packet switched cellular systems in the telecommunications community, is the extension of the present Global System for Mobile Communication (GSM), known as General Packet Radio Service (GPRS).

GPRS is a packet switched system that uses the same physical carrier structure as the present GSM cellular communication system and is designed to coexist and provide the same coverage as GSM. The GPRS radio interface is thus based on a TDMA (Time Division Multiple Access) structured system with 200 kHz carriers divided into eight timeslots with GMSK (Gaussian Minimum Shift Keying) modulation. The multiplexing is such that each timeslot can typically serve a number of users. One user can also be allocated more than one timeslot to increase its throughput of data over the air.

The GPRS specification includes a number of different coding schemes to be used dependent on the quality of the radio carrier. With GPRS, data rates well over 100 kbps will be possible.

There is also ongoing a development and standardization of a new air interface mode in GSM, which will affect both packet and circuit switched modes. This new air interface mode is called EDGE, Enhanced Data rates for Global Evolution. EDGE's main features are new modulation and coding schemes for both packet switched and circuit switched data communication. In addition to the Gaussian Minimum Shift Keying (GMSK) modulation, an 8 symbol Phase Shift Keying (8PSK) modulation is introduced. This modulation can provide users with higher bit rates than GMSK in good radio environments.

A new technique called link quality control is introduced with EDGE. Link quality control is a functionality that allows adaptation in terms of coding and modulation with respect to present signal quality. In poor radio conditions, a robust coding and GMSK modulation is selected whereas in good radio conditions, a less robust coding and 8PSK modulation is used. GPRS (and the extensions thereof) also provides a backward error correction functionality in that it can request retransmissions of erroneously received blocks. This mechanism is called ARQ (Automatic Repeat reQuest) and is well known in the art.

The packet data mode with EDGE modulation is called EGPRS (Enhanced GPRS) and the circuit switched data mode is called ECSD, Enhanced Circuit Switched Data. Bitrates over 384 kbps will be possible with EDGE.

Recent development for another TDMA based cellular system, the cellular communication system compliant to the ANSI/136 standard, below referred to as TDMA/136, has been focused on a packet data system to be integrated with the TDMA/136 circuit switched mode.

This packet data system will also be based on the new EDGE technology as defined for the GPRS extension. It will then allow TDMA/136 operators to provide bit rates up to 384 kbps on 200 kHz carriers with GMSK and 8PSK modulation as defined for EGPRS.

This integration of TDMA/136 and EDGE, does not, however, come without a cost. The TDMA/136 carriers have a bandwidth of only 30 kHz, to be compared with EDGE carriers of 200 kHz. This means that operators that want to introduce EDGE, have to allocate 200 kHz for each EDGE carrier or, to put it in another way, to free up spectrum for each EDGE carrier corresponding to 7 already existing 30 kHz carriers. Since operators already today are using these 30 kHz carriers for circuit switched communications, there is a large interest that the initial deployment for EDGE in TDMA/136 systems should be made on as small a spectrum as possible.

Reuse patterns are used in cellular systems, such that one can reuse the same frequencies in different cells. Systems are usually planned such that a number of cells share a number of available channels. For example, in a 4/12 frequency reuse, there are 4/12 different cells that share a set of frequencies. Within these 4/12 cells, no frequency is used in more than one cell simultaneously. (The number 4 in "4/12" denotes the number of base station sites involved in the 12 reuse. The 4/12 denotation thus indicates that a base station site serves 3 cells.) These 12 cells then form what is referred to as a cluster. Clusters are then repeated, to provide coverage in a certain area.

Similarly in a 1/3 reuse, there are 3 different cells that share a set of frequencies. Within these 3 cells, no frequency is used in more than one cell simultaneously. Thus, the higher the reuse, the better the carrier to interference ratio for an exemplary condition. For lower reuse patterns, the carrier to interference ratio is lower, since the distance between two base stations transmitting on the same frequency is shorter. An exemplary 1/3 reuse is illustrated in FIG. 1.

GPRS channels typically have different levels of robustness depending on the type of logical channel being transmitted. A logical channel is defined by its information content and is transmitted on one or several physical channels, defined by the physical channel structure, e.g., a timeslot on a certain frequency. In a packet data system, reliance on retransmission possibilities can allow a quite high error rate which means that the reuse for user data traffic channels can be kept quite low. For example, a data traffic channel can be deployed in a 1/3 reuse whereas common control channels and broadcast channels are not robust enough to be allocated in a ⅓ reuse, since the same retransmission possibilities are not used for these types of logical channels. At least a ⅜ or even a 4/12 reuse is recommended for packet data common control and broadcast channels.

Note that a ⅜ reuse entails that at least nine 200 kHz carriers are needed (i.e., TDMA operators must provide at least 1.8 MHz of spectrum for an initial deployment). This is considered quite substantial in a TDMA system with 30 kHz carriers.

This fact has driven the TDMA community to find other solutions for initial deployment of a packet data system based on EDGE and GPRS. U.S. Pat. No. 6,438,115 entitled, "High Speed Data Communication System and Method", to Mazur et al., hereby incorporated by reference herein, teaches a method of combining TDMA/136 and the EGPRS mode of EDGE.

Briefly, the solution is to put requirements on the base station transmissions of the EDGE carriers. Base station transmissions of EDGE carriers should be time synchronised. It is then possible to allocate the control channels on different frequencies and different timeslots in different cells and thereby construct a higher reuse than what is possible by only considering frequencies. This solution is often referred to as EDGE Compact. In addition to the frequency reuse, a time reuse is introduced. For example, a certain base station transmits control signalling on a certain timeslot at a certain time and on a certain frequency, at which no other base station in the same control channel cluster (i.e., all cells where each physical channel carrying control signalling is used once and only once) is transmitting anything at all. This is repeated between a number of base stations, such that different time groups are formed. Further, to increase reliability of control channel detection in the mobile stations and base stations respectively, timeslots adjacent to each other do not both carry control channel information.

EDGE Compact provides the opportunity to introduce a higher reuse than that allowed by frequency repetition only. Thus, it will be possible to allow an initial deployment of a GPRS/EGPRS packet data system within a spectrum bandwidth much smaller than that otherwise limited by the reuse requirement for the control channels. In FIG. 4, a typical allocation for the control channels is illustrated. Therein, four different time groups are illustrated on a single frequency, i.e., a 4×time reuse is formed. In one cell, control information is transmitted in timeslot 1, (TS1), i.e., timegroup 1 (TG1), in certain GSM frames defined. Base stations transmitting control information on the same frequency but belonging to another time group, will not transmit at all during the frames that are used for control in base stations belonging to TG1. In another cell, control information is transmitted in TS3 (i.e., TG2), again in certain GSM frames. Base stations transmitting control information on the same frequency but belonging to another time group, will not transmit at all during the frames that are used for control in base stations belonging to time group 2. Similar reasoning applies for TS5 and TS7. Combining the time reuse with e.g., a ⅓ frequency reuse, it is possible to transmit control information in an effective 4/12 reuse using only 3 frequencies. In FIG. 4, different types of control information or logical control channels have been indicated. In block B0, broadcast information is transmitted on a logical Broadcast Channel (BCCH) and, e.g., in block C8 logical Common Control Channels (CCCH) is transmitted (e.g., paging messages). The structure of the control channel is such that more blocks than those indicated can be allocated for broadcast or control. For example, if one more block is needed for CCCH, this can be allocated in physical block 2, on GSM frames 8–11. Allocation of 2–12 blocks is possible on a single timeslot. One broadcast information block and one common control block is always needed.

Further, to be able to find this control channel, a frequency correction burst and a synchronization burst is included in each 52 multiframe. A mobile will first search for the Frequency correction burst (located in GSM frame 25) and then it will know that following this, there will be a synchronization burst 26 GSM frames later, on the same timeslot. This synchronization burst will help the mobile station to identify the base station and to know where in the multiframe structure it is.

FIG. 3 illustrates an exemplary cell pattern that is formed of the reuse of time groups and frequencies combined. Note that in EDGE Compact, only the control channels are transmitted in the higher reuse, utilizing the time groups. The traffic channels are still transmitted in a ⅓ reuse.

The transmission of control information in EDGE Compact is different than the control channel transmissions in present GSM systems. Present GSM systems have at least one carrier in each cell that transmits continuously with constant power (i.e., it transmits on all timeslots, even if there is no traffic allocated). This continuous transmission serves as a beacon in the system, for mobiles to more easily find the control channel carrier, identify the cell and e.g., make signal strength measurements for mobile assisted handover algorithms. In the EDGE Compact case, the suggested control channel carrier is discontinuous; when a certain base station transmits control information, all other base stations in that cluster that uses the same frequency are quiet.

EDGE Compact, with its discontinuous transmission on the control channel carrier frequency, provides the possibility to deploy a packet data system in a spectrum well below the 1.8 MHz, as earlier was discussed. In the example described, operators may deploy an EDGE Compact system with only three 200 kHz carriers.

It would also be interesting to provide circuit switched communication, e.g., GSM circuit switched voice communication in a system that can be deployed within a small frequency spectrum. There are, however, some fundamental differences between packet and circuit switched communication, that creates problems not addressed in the prior art. One of these difficulties relates to neighbor cell signal strength measurements.

A fundamental difference between packet switched and circuit switched communication is that for circuit switched communication, e.g., a voice call, a continuous connection in both uplink, from the mobile station to the base station, and downlink, from the base station to the mobile station, is allocated. An illustration of the allocation of up and downlink physical channels in GSM is illustrated in FIG. 2. A connection between a base station and a mobile station is allocated one timeslot for uplink traffic and one timeslot for downlink traffic. Each direction has its own spectrum allocation, i.e., uplink carriers are defined in one spectrum range and downlink carriers are defined in another spectrum range.

In FIG. 2 is illustrated that allocation of the uplink is also shifted in time from that of downlink, such that e.g., uplink timeslot 1, (UL1) is aligned with downlink timeslot 4 (DL4). The reason for this is that a mobile should not have to do both receive and transmit operations at the same time. Additionally, since uplink and downlink transmissions are separated in frequency, some time is required for mobiles to adjust transceiver filters between reception and transmission.

In the period after the receive and the transmit periods, signal strength measurements from neighbor cells may be performed. In systems employing Mobile Assisted Handover (MAHO), like e.g., the GSM system, when allocated a traffic channel, mobiles use the idle period between active slots for measurements on the control channels of adjacent base stations. Since only a few time slots are available for such measurements (there is only a 4 timeslot duration between a mobiles transmit and receive slot), the base stations are usually required to transmit continuously on all the time slots of the frequency used by the control channel. Since EDGE Compact base stations are not transmitting continuously, a mobile must know or be informed when it can measure signal strength for a certain neighbor.

With the EDGE Compact systems, it is the case that if a mobile is allocated e.g., DL2 and UL2 for traffic, then UL2 coincides in time with control channel transmissions on DL5, in the downlink. It will thus be difficult for a mobile with downlink traffic on DL2 and uplink on UL2 to make measurements on control channel on DL5. This is normally not a problem in a packet switched system, since it is rare that a mobile is allocated both uplink and downlink continuously. Additionally, it will probably be quite rare that a mobile is a sole user on a timeslot. Thus, with packet switched transmission, there will be certain GSM frames that are not busy for traffic on DL2/UL2 uplink and downlink, and the mobile can then make measurements on the control channel transmitted on downlink DL5.

However, for the case with a circuit switched connection, the situation is different. There, a connection is formed of a continuous use of both uplink and downlink. Hence, a mobile will not be able to make any neighbor cell measurements on some of the time groups where control channels are allocated on certain time slots.

It would therefore be advantageous to provide a solution where an EDGE Compact system can provide enough measurement possibilities for all the neighbor cells using different time groups, such that circuit switched communication could be introduced also in an EDGE Compact scheme.

SUMMARY OF THE INVENTION

The present invention solves the problem of providing adequate neighbor cell measurement opportunities in an EDGE Compact scheme, as described in the background description. This will enable allocation of circuit switched connections also in a system employing a control channel structure where the frequency carrying the control information is discontinuously transmitted.

In one aspect of the present invention, a slot hopping control channel is introduced. This means that a control channel is not continuously allocated on one single timeslot, but shifts use of timeslots according to some regular predefined hopping pattern. Thus, a mobile that is allocated a certain timeslot for traffic in the uplink and a corresponding timeslot in the downlink for traffic will, during the time it can make measurements, experience control channel transmissions from different base stations serving different cells.

The regular hopping pattern for the control channels ensures that an equal number of measurements can be taken for each neighbor during the time when a mobile can make measurements. The hopping sequences are made orthogonal between different base stations, such that no base station transmits control in the same timeslot on the same frequency as any other base station within a cluster.

In yet another aspect of the present invention, the slot hopping is introduced such that a certain control channel allocation always shifts to a timeslot preceding the presently allocated timeslot. For example, if a base station is transmitting control information in timeslot 5, DL 5 during a certain period, then during the next period, timeslot 3, DL 3 will be used for that control channel. By hopping backwards, there will be no overlap of uplink and downlink allocation, which would otherwise be the case by hopping in the forward direction, from timeslot 7, DL7 to timeslot 1, DL1, etc.

In yet another aspect of the present invention, the mobile is notified about the hopping sequence by reading the synchronization burst. The content of the synchronization burst does not include information about where the hopping sequence starts for a certain control channel. Instead, the allocation of a certain synchronisation burst from a certain base station, is such that it is allocated on the same timeslot as will be used for the first transmission in the following GSM frame in the predefined hopping sequence for other control channels in the same time group. The synchronization burst may or may not employ slot hopping.

In yet another aspect of the present invention, a system is described in which a slot hopping control channel is implemented. This system is able to provide measurement opportunities for mobile stations allocated continuous uplink and downlink timeslots. This enables continuous communication, such as circuit switched voice communication, in both directions in a communication system such as EDGE Compact, employing a discontinuous control channel carrier.

According to an exemplary embodiment, a radio communications system employing time reuse for transmission of at least one logical channel includes a base station and at least one mobile station. In the embodiment, the base station transmits a downlink common control or broadcast channel to the at least one mobile station on a portion of a first timeslot and on a subsequent portion of a second timeslot, wherein the second timeslot is a preceding timeslot with respect to the first timeslot. In other words, where the first and second timeslots follow a particular order of transmission, the transition from the second timeslot to the first timeslot is in reverse order as compared to the transmission order. For example, for GPRS timeslots 1 through 7, wherein control and broadcast information is typically transmitted on the odd timeslots, timeslot 1 is a preceding timeslot with respect to timeslot 3, timeslot 3 is a preceding timeslot with respect to timeslot 5, timeslot 5 is a preceding timeslot with respect to timeslot 7, and timeslot 7 is a preceding timeslot with respect to timeslot 1.

According to the invention, the portion of the first timeslot and the subsequent portion of the second timeslot can occur within a single block of four GPRS downlink frames. Alternatively, the portion of the first timeslot can occur in a first block of four GPRS downlink frames, while the subsequent portion of the second timeslot occurs in a subsequent block of four GPRS downlink frames.

In addition to transmitting on the first and second timeslots, the base station can, more generally, transmit a downlink common control or broadcast channel on successive portions of timeslots in a sequence of n timeslots (n an integer greater than 1), wherein an $m^{th}$ timeslot in the sequence, for every m in a range of 2 to n, is a preceding timeslot with respect to an $(m-1)^{th}$ timeslot in the sequence.

For example, the base station can transmit the downlink common control or downlink broadcast channel on successive portions of a sequence of n timeslots in each of a succession of GPRS multi-frames.

According to the invention, the same sequence of n timeslots can be used in every multi-frame, or the sequence of n timeslots can change from multi-frame to multi-frame. Additionally, each multi-frame can include a synchronization burst indicating which sequence of n timeslots is used in a multi-frame.

For example, the synchronization burst for a multi-frame can be transmitted in a timeslot corresponding to the first timeslot in the sequence of n timeslots used in that, or a following, multi-frame. Advantageously, the synchronization burst can be transmitted in the same timeslot in each multi-frame, or the synchronization burst can be transmitted in a timeslot in each multi-frame such that the synchronization burst is a part of a timeslot hopping pattern provided by the sequence of n timeslots in the multi-frame.

According to another exemplary embodiment, a radio communications system employing time reuse on broadcast and common control channels includes a first base station transmitting a downlink broadcast or common control channel during a first portion of a first timeslot and during a subsequent portion of a second timeslot, and a second base station transmitting a downlink broadcast or common control channel during a first portion of the second timeslot and during a subsequent portion of a third timeslot. For example, the first portion of the first time slot and the first portion of the second timeslot can occur in a first GPRS frame, and the subsequent portion of the second timeslot and the subsequent portion of the third timeslot can occur in a subsequent GPRS frame.

The exemplary system further includes a mobile station measuring the transmissions from the second base station during at least a part of the first portion of the second timeslot and measuring the transmissions from the first base station during at least a part of the subsequent portion of the second timeslot. Additionally, either of the base stations can transmit a dummy burst during a portion of the second timeslot, the dummy burst being transmitted at a power level equal to a power level used by the base station in transmitting a broadcast or common control channel on the second timeslot.

BRIEF DESCRIPTION OF THE DRAWINGS

These and other features, objects and advantages of the present invention will be readily apparent to those skilled in the art when reading the following detailed description, where references are made to the appended figures in which:

FIG. 5 illustrates an exemplary hopping control channel allocation pattern in a 52 multiframe, including Packet Synchronization Channel and Packet Frequency Correction Channel allocation structure according to one embodiment of the present invention.

DETAILED DESCRIPTION OF THE INVENTION

The invention is hereinafter described with reference to a GSM cellular communication system. It should be noted however, that other types of cellular systems can make use of the invention, and that the description is to be considered exemplary. It should further be noted that the term GSM in the following description refers to both circuit switched and packet switched modes, both with GMSK as well as with 8PSK modulation.

In a GSM communication system, physical channels on which communication can occur are divided into timeslots on a radio frequency carrier. Each carrier frequency is divided into eight timeslots, or eight physical channels. Eight consecutive timeslots form a GSM frame. The timeslots are labeled TS0–TS7, refering to both uplink and downlink timeslots. Also, designators DL0–DL7 are used when referring specifically to downlink timeslots, and designators UL0–UL7 are used when referring specifically to uplink timeslots.

Four consecutive GSM frames form one block on each timeslot, TS0–TS7. There are different types of repetition cycles in the frame structure in GSM and EDGE Compact. One such repetition is the 52 multiframe, containing 52 consecutive GSM frames. This is the repetition cycle for many of the control channels in GSM and EDGE Compact, e.g., broadcast channels and common control channels but also traffic channels for user data. The 52 multiframe structure is used in GSM for all timeslots where traffic channels can be allocated. In EDGE Compact, it is always used.

The 52 multiframe also includes, apart from 12 blocks (i.e., 4*12=48 GSM frames) for traffic or control, 2 idle GSM frames and 2 GSM frames used for Packet Timing Advance Control Channel Signalling (PTCCH), for a total of 4*12+2+2=52 GSM frames. The GSM frame structure and block allocation of logical channels is further described in ETSI TS 100 908 v.6.2.0 Digital Cellular Communication System (Phase 2+); "Multiplexing and multiple access on the radio path" (GSM 05.02 version 6.2.0 Release 1997), hereby incorporated by reference.

Figure 1:
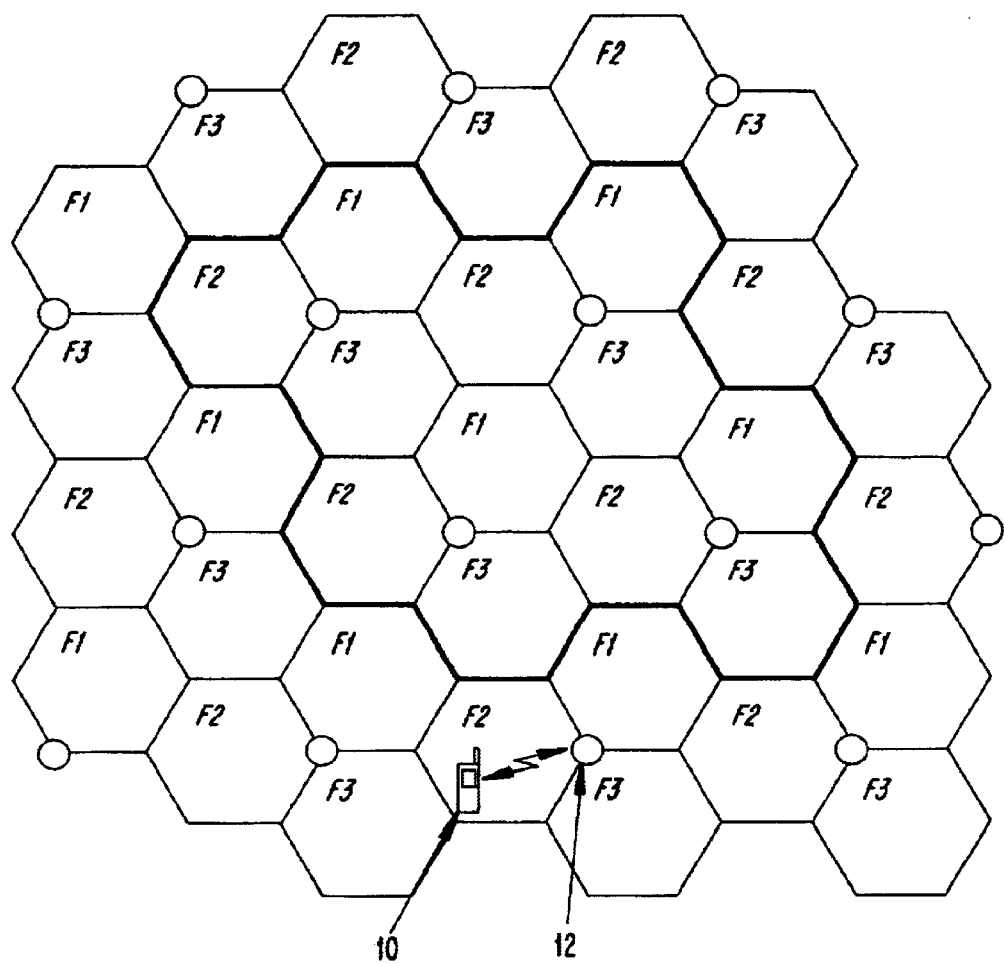
FIG. 1 illustrates a cellular pattern of a ⅓ frequency reuse.

FIG. 1 illustrates a typical ⅓ reuse pattern. Communication between an exemplary mobile 10 and an exemplary base station 12 is possible in each cell, by allocating a frequency and a timeslot to a certain connection. The base stations can be situated in the center of a cell, in which case the antenna is transmitting in all directions. Alternatively, base station sites can serve e.g., 3 different cells, as in the figure, in which case sector antennas are used. A ⅓ reuse is a possible reuse pattern for data traffic. However, for control information or circuit switched communication, e.g., voice, a higher reuse is necessary.

Figures 2, 3:
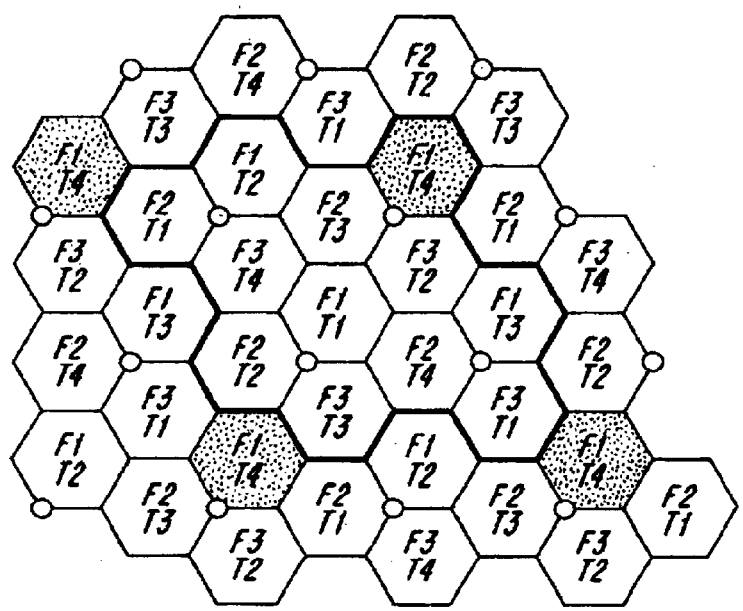
FIG. 2 illustrates an exemplary timeslot structure for up and downlink allocation according to the GSM specification.
FIG. 3 illustrates a cellular pattern of a ⅓ frequency combined with a 4×time reuse, creating an effective 4/12 time-frequency reuse.

The timeslot structure is illustrated in FIG. 2. Uplink transmissions occur in a different frequency region than downlink transmissions, but the timeslot structure is the same. FIG. 2 illustrates a time shift of three time slots such that mobiles should not have to perform both receive and transmit operations simultaneously.

The introduction of an EDGE Compact system is based on the possibility of initial deployment of a packet data system using three carriers only. These carriers carry both data traffic and packet associated and common control signalling. A ⅓ frequency reuse pattern forms the cell structure for the EDGE carrier. The base stations are, however, time synchronised. This makes it possible to allocate, e.g., Packet Common Control Channels (PCCCH) and Packet Broadcast Control Channels (PBCCH) in a way to prevent simultaneous transmission from different base stations, to create higher effective reuse for control signalling, e.g., a $^1/_{12}$ reuse pattern. This is illustrated in FIG. 3. In FIG. 3, a frequency repetition pattern f1-f2-f3 is illustrated together with an overlaid time group pattern t1-t2-t3-t4.

Each base station sector is assigned one of these time groups. In a neighbor sector using the same frequency, a different time group is used. Of course, it is also possible to assign a different number of time groups, and thereby form a different reuse. The four time groups are to be considered exemplary.

Figure 4:
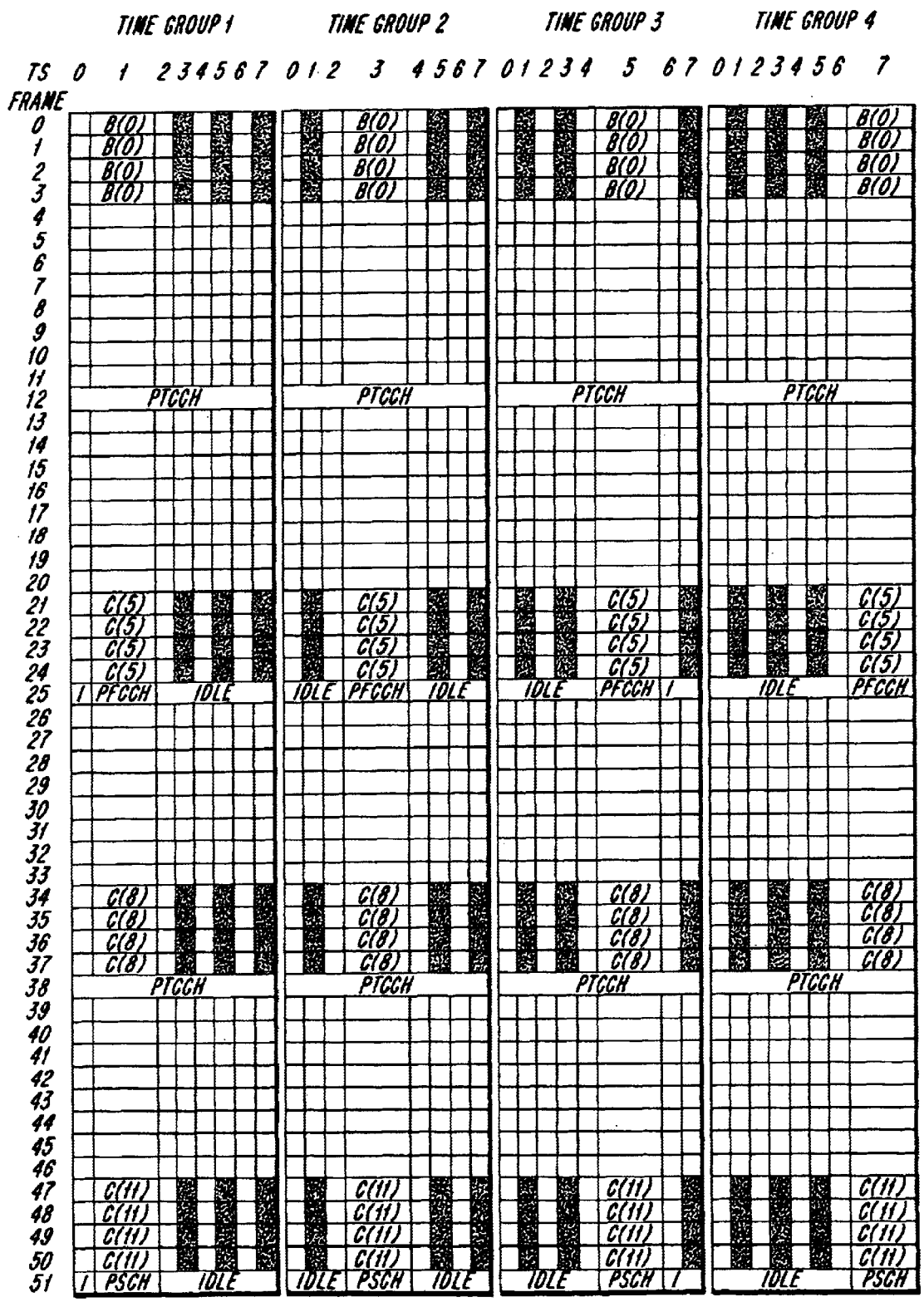
FIG. 4 illustrates a packet control channel allocation pattern in a 52 multiframe structure.

In FIG. 4 is depicted an exemplary allocation of control channels for an EDGE Compact system. FIG. 4, illustrates that a certain number of blocks on certain timeslots can be allocated for control channel transmissions, whereas other blocks on the same timeslots can be used for traffic (packet transmission in an EDGE Compact system is interleaved over 4 GSM frames, which is referred to as a block). There is flexibility in the number of control blocks to allocate. In FIG. 4, one broadcast information transmission is allocated in the first block, in GSM frames 0–3, and three common control channel blocks are allocated in blocks 5, 8 and 11 on GSM frames, 21–24, 34–37 and 47–50, respectively. The other periods on the timeslots used for control can be used for additional control channel blocks or packet data traffic channels.

FIG. 4 also illustrates, by shading some blocks in the different time groups, silent periods. For example, base stations in time group 1 will not transmit at all when base stations in other time groups transmit control information. This is indicated in FIG. 4 by shading some of the blocks, e.g., TS3 and TS5 and TS7 in block B0 in time group 1. (It should be noted that the terminology TS# (timeslot #) is used when both uplink,UL, and downlink, DL, timeslots are considered).

In GSM frame 25, a frequency correction burst is included, and in GSM frame 51 a synchronisation burst is included. These bursts enable mobiles to find the control channel and identify the current phase in the GSM frame repetition pattern.

Figure 5:
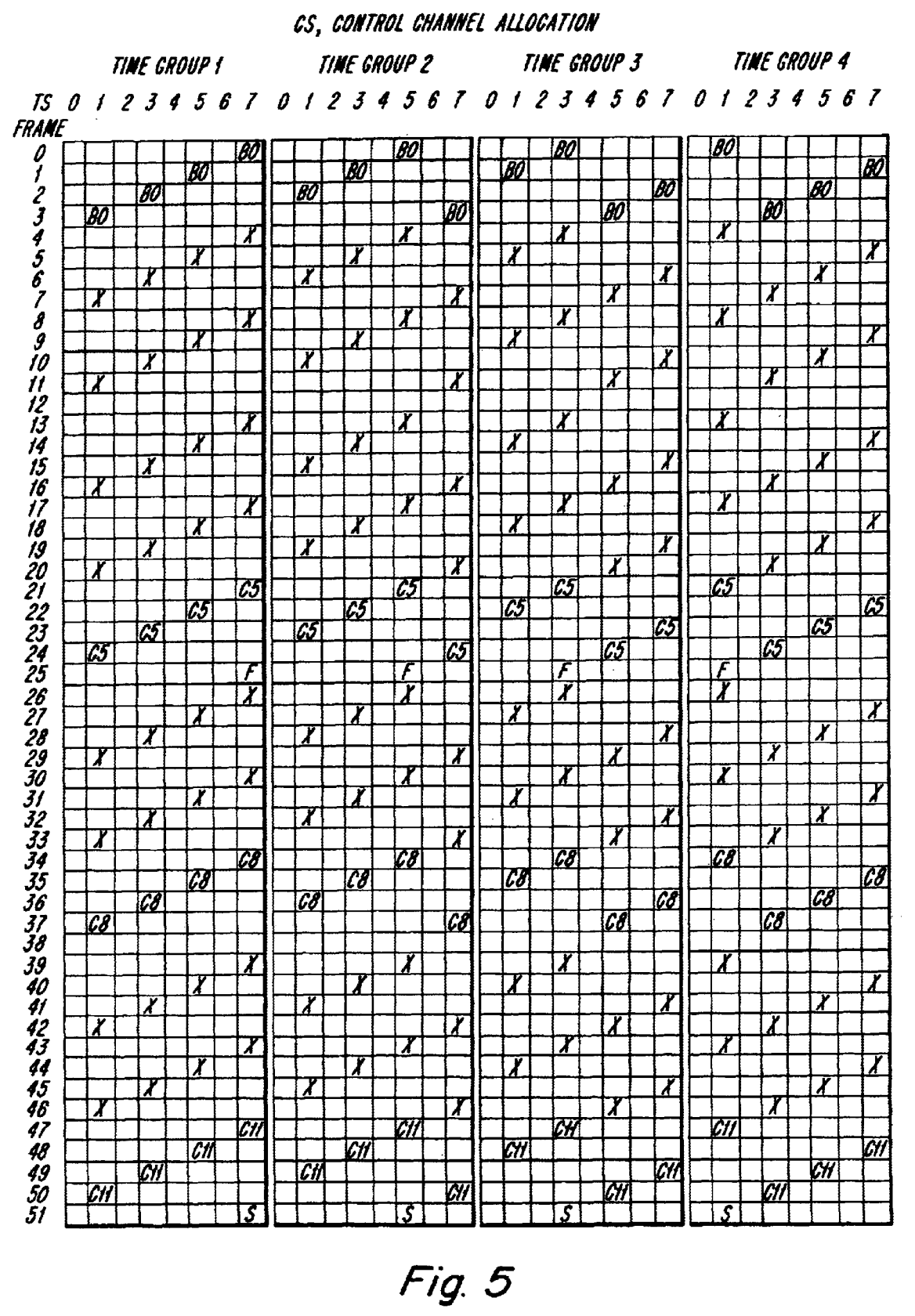

According to one aspect of the present invention, the allocation of control channel blocks illustrated in FIG. 4 is split between different timeslots. A time group is defined by a starting timeslot and a predefined, regular slot hopping pattern. This slot hopping control channel is illustrated in FIG. 5, where only downlink is illustrated. A control channel in the uplink, i.e., a Random Access Control Channel (RACH) will be similarly allocated.

Time group 1 utilizes TS7-TS5-TS3-TS1 for its control channel block transmissions. Time group 2 similarly utilizes TS5-TS3-TS1-TS7, and time group 3 and time group 4 use the hopping sequences TS3-TS1-TS7-TS5 and TS1TS7-TS5-TS3, respectively. A control channel block is interleaved over 4 GSM frames. A control channel block thus starts a hopping sequence on different timeslots in different time groups. Since the hopping pattern is the same, orthogonality between different time groups is maintained and thus also the orthogonality between control channel transmissions of different base stations. In FIG. 5, an exemplary repetition pattern is illustrated. Other repetitions are possible. For example, it is possible that hopping occurs, not several times per control block, but rather between block periods, i.e., after 4 GSM frames.

The hopping pattern is such that a mobile always knows how to hop. This can either be a predefined hopping pattern that is always used, or information about the hopping pattern can be indicated in a synchronization burst that a mobile always initially decodes to find out a current frame number.

Considering the hopping pattern from the perspective of a mobile engaged in circuit switched communication, note that a busy mobile will have certain timeslots allocated for traffic, in both uplink and downlink directions. Note that in this example, the traffic channel will not employ any hopping pattern, but will be continuously transmitted on one and the same timeslot. In this example, a mobile allocated only a single slot in the uplink and a single slot in the downlink is considered. The same reasoning applies for other types of allocations, e.g., a mobile that is allocated more than one slot in one or both directions, i.e., multislot allocations.

Consider again FIG. 2, where uplink and downlink are illustrated. If a mobile is engaged in circuit switched communication, then only DL0/UL0, DL2/UL2, DL4/UL4 or DL6/UL6 can be allocated, since no continuous allocation is possible on the s a me time slots that have control channel transmissions to handle (i.e., DL1/UL1, DL3/UL3, DL5/UL5 and DL7/UL7). If additional carriers are added to EDGE Compact system, where no control channel transmission is allocated, then circuit switched communication can be allocated on any of the timeslots. A mobile can make signal strength measurements on base station transmissions for neighbor cells during a period after the UL timeslot. For example, a mobile allocated DL0/UL0 is able to make signal strength measurements in DL5. In the period coinciding with DL5, it must be possible to measure on all neighbors. For a certain frequency, measurements must be possible on transmissions from base stations belonging to any of the time groups defined.

With the exemplary hopping pattern illustrated in FIG. 5, DL5 will at some point be allocated for control in all the time groups. Thus, if a mobile knows the slot hopping pattern of the different time groups, it will be able to make signal strength measurements from all the neighbor cell time groups by listening only to on e time slot. Shifting to another frequency, a mobile can similarly listen to all the time groups on that frequency by only listening on e.g., DL5. This will enable continuous allocation of traffic, since a mobile will no t suffer from the fact that an uplink timeslot coincides with the timeslot where control information is transmitted.

According to another aspect of the present invention, packet traffic channels are also transmitted in a slot hopping fashion. For example, if packet data channels are allocated on the same timeslot as those of control channel transmissions, i.e., if packet transmissions occur on one or several of TS1, TS3, TS5 or TS7, these packet data channels also perform slot hopping. This slot hopping follows the same pattern as that used for the control channels. Additionally, these packet data channels can be transmitted with the same power as the control channel transmissions so that mobiles can make measurements on these channels as well, and are not restricted to make signal strength measurements during the control blocks only. This will enable mobiles to take a higher number of signal strength samples on neighbor cells during a certain time period, providing for better MAHO performance. This is illustrated in FIG. 5.

In FIG. 5, one broadcast block, B0, and three common control channel blocks, CCCH, C5, C8 and C11, are illustrated. Other combinations of control blocks are possible. FIG. 5 also illustrates that the blocks not used for control on the control channel timeslots can be used for traffic. These blocks are marked with an "x". If these "x" blocks are to be measured on, dummy bursts are transmitted if no traffic is allocated to those blocks. These dummy bursts are also transmitted with the same power as the control channel transmissions.

Alternatively, if it is considered sufficient to measure on the control channel blocks, then packet data channels can be allocated to timeslots that carry control, and then these packet data channels do not have to perform any hopping.

In other aspects of the present invention, a mobile is notified about where a hopping sequence cycle starts by detecting the synchronization burst(s) indicated in FIG. 5, and located in GSM frame 51 in the 52 multiframe. The synchronization burst is detected by mobile stations to acquire frame synchronization and for base station identification purposes. The coding of the synchronization burst includes an absolute frame number reference as well as the identity of the transmitting base station. The absolute frame number is a reference to a frame in the largest cycle defined in GSM, which contains 2715648 frames.

When a mobile is powered on, it scans all frequencies where a control channel can be found and searches for a frequency correction burst, F. This burst is included in FIG. 5 in GSM frame 25. After having found the frequency correction burst, a mobile searches for the synchronization burst, S, on a predefined allocation away from the frequency correction burst (GSM frame 51), such that it can determine the absolute frame number and the identity of the transmitting base station.

In one exemplary embodiment, the synchronization burst is always allocated in the same timeslot as the control channel transmissions first slot hopping allocation in the 52 multiframe. For example, if a synchronization burst for a certain time group is transmitted in timeslot 7, TS7, then the control channel allocation in GSM frame 0 of the 52 multiframe is also on TS7. In FIG. 5, the synchronization burst is aways transmitted in the same timeslot. Alternatively, it can also hop on the different control channel timeslots. This would then imply that the hopping cycles for the different time groups would also change. If so, then a time group would, during one 52 multiframe, hop according to TS7-TS5-TS3-TS1 when the synchronization burst is allocated on TS7. In the next 52 multiframe, the synchronization burst can be allocated on TS5, and then the hopping pattern TS5-TS3-TS1-TS7 is used. Further, the synchronization burst hops to TS3, implying that control channels in that time group use TS3-TS1-TS7-TS5 as a hopping sequence, and similarly when the synchronization burst is allocated on TS1, i.e., TS1-TS7-TS5-TS3.

Note, however, that it can be advantageous to always keep the frequency correction and the synchronization burst on the same timeslot, to make it easier for mobiles to find the synchronization burst once it has found the frequency correction burst.

The control channels in the foregoing exemplary description of the invention have been control channels mapped in a 52 multiframe repetition structure for TS1, TS3, TS5 and TS7. It is however possible to use another multiframe for control channel timeslots as well. For example, a 51 multiframe strucuture such as that used for the timeslot carrying the broadcast and common control channels in GSM can also be used.

With the slot hopping control channel allocation of the present invention, circuit switched communication is enabled in EDGE Compact systems on timeslots that do not carry control information, TS0, TS2, TS4 and TS6. Typically, all cells cannot allocate circuit switched communication on all these time slots simultaneously, since the control carrier is only planned in a 3 reuse pattern. Some type of fractional loading is necessary. Additional carrier frequencies, however, can be planned in any reuse, since they do not have to carry any hopping control channel.

Additionally, advantages are provided also for packet switched communication. A mobile can now make measurements even if it is continuously allocated on the same timeslot, e.g., if it is a sole user or if it is using a real time service over packet switched transmission.

Figure 6:
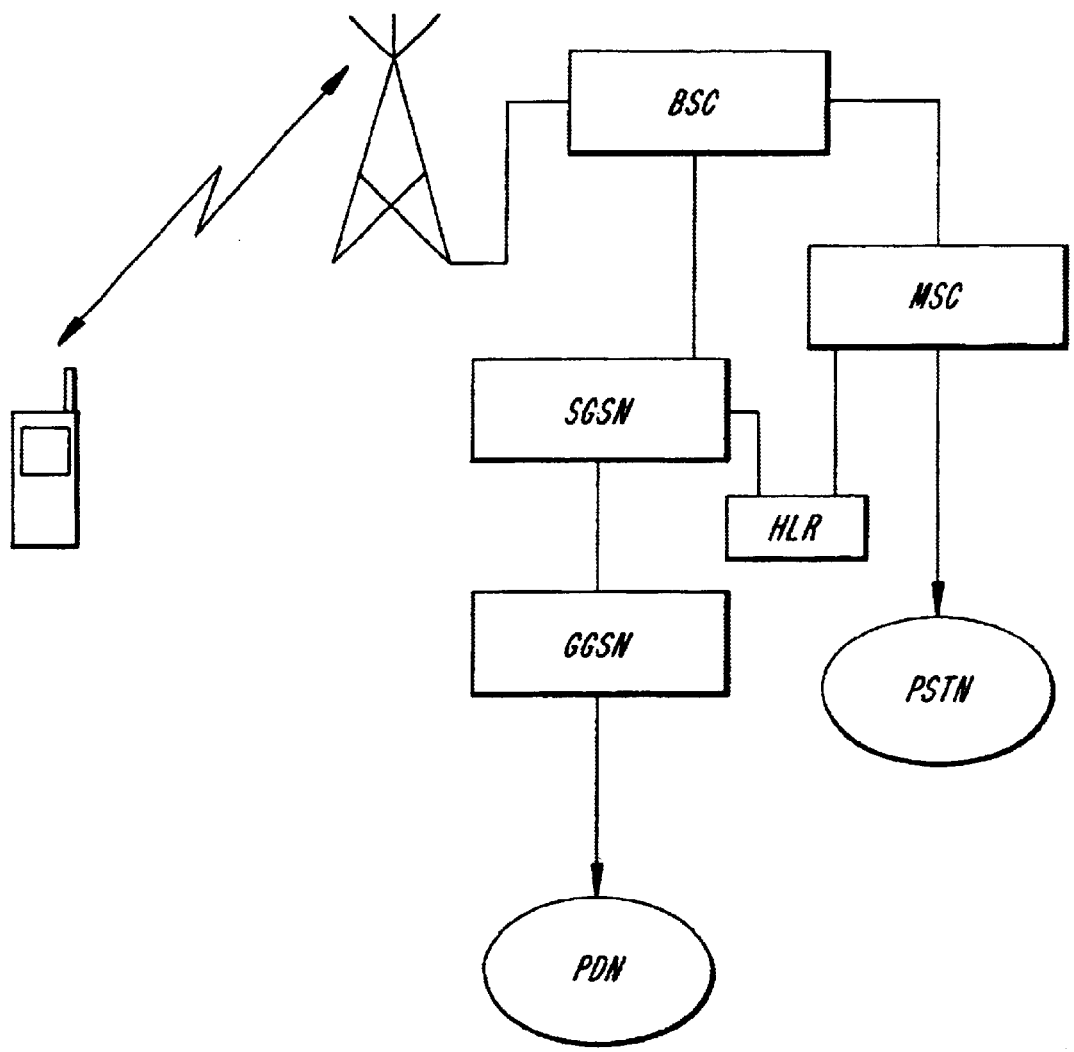
FIG. 6 illustrates a circuit switched system integrated with a GPRS system according to one embodiment of the present invention.

FIG. 6 illustrates an exemplary communication system 60 in which the invention can be used. Communication systems generally contain several more nodes than those shown in FIG. 6, and some of the nodes illustrated may not be present (though the functionality can be included in other nodes). The figure is simplified for purposes of explanation rather than limitation.

In FIG. 6, a mobile station 61 communicates over the air interface with a base station 62 that is connected with a Base Station Controller (BSC) node 63. The BSC node 63 typically handles radio related control, such as allocation of control channels on different physical channels. The BSC is connected with a Mobile services Switching Center (MSC) 64, which basically is an exchange for communication sessions, where routing functionality is included. The MSC typically serves a number of BSCs, although only one BSC is illustrated in the figure. MSCs are then connected to an external communication network, such as a Public Switched Telephone Network (PSTN) 65.

The BSC 63 can additionally be connected to a GPRS packet data network that contains a Serving GPRS Support Node (SGSN) 66 and a Gateway GPRS Support node (GGSN) 67. The GGSN is then connected to external packet data networks (PDN) 68. A Home Location Register (HLR) 69 is also illustrated. This node is connected to both the SGSN and the MSC to provide these nodes with subscriber information, as is known in the art.

In this exemplary system, allocation of control channels is possible according to the described techniques of the present invention. The BSC will handle the allocation of control channels according to the slot hopping patterns described and also the allocation of circuit switched control channels without any slot hopping pattern.

Although exemplary embodiments of the present invention have been described with respect to a communication system compliant to the GPRS/GSM standard specification, those of ordinary skill in the art will appreciate that the solutions presented are equally applicable to any other communication system. The specific embodiments should therefore be considered exemplary rather than limiting the scope of the invention, which is defined by the following claims.

What is claimed is:

1. In a radio communications system employing time reuse for transmission of at least one logical channel, a method of transmitting broadcast and common control information from a base station in a first time group to mobile stations in the system, said method comprising the steps of:

transmitting the broadcast and common control information in a first allocated timeslot in a first frame;

transmitting the broadcast and common control information in a second allocated timeslot in a second frame, said second allocated timeslot having a different position in the second frame than the position of the first allocated timeslot in the first frame; and transmitting in each frame, a synchronization burst indicating to the mobile stations in the system, which timeslot in that frame includes the broadcast and common control information.

2. The method of claim 1, wherein the system is a General Packet Radio Service (GPRS) system, and wherein the first timeslot and the second timeslot occur within a single block of four GPRS downlink frames, and the second timeslot is in a preceding position within the second frame with respect to the position of the first timeslot within the first frame.

3. The method of claim 1, wherein the system is a General Packet Radio Service (GPRS) system, and wherein the first timeslot occurs in a first block of four GPRS downlink frames, and wherein the second timeslot occurs in a second, subsequent block of four GPRS downlink frames.

4. The method of claim 1, wherein a the base station transmits a the downlink common control or broadcast channel in successive portions of a sequence of n timeslots (n an integer greater than 1), and wherein an $m^{th}$ timeslot in the sequence, for every m in a range of 2 to n, is a preceding timeslot with respect to an $(m-1)^{th}$ timeslot in the sequence.

5. The method of claim 4, wherein the system is a General Packet Radio Service (GPRS) system, and wherein the base station transmits the downlink common control or downlink broadcast channel in successive portions of a the sequence of n timeslots in each of a succession of GPRS multi-frames.

6. The method of claim 5, wherein the same sequence of n timeslots is used in every multi-frame.

7. The method of claim 5, wherein the sequence of n timeslots changes from multi-frame to multi-frame.

8. The method of claim 5, wherein the step of transmitting a synchronization burst includes transmitting in each multi-frame, a synchronization burst indicating, to the mobile stations in the system, which sequence of n timeslots is used in a the multi-frame.

9. The method of claim 8, wherein the synchronization burst for a multi-frame is transmitted in a timeslot corresponding to the first timeslot in the sequence of n timeslots used in the multi-frame.

10. The method of claim 8, wherein the synchronization burst for a multi-frame is transmitted in a timeslot corresponding to the first timeslot in the sequence of n timeslots used in a following multi-frame.

11. The method of claim 8, wherein the synchronization burst is transmitted in the same timeslot in each multi-frame.

12. The method of claim 8, wherein the synchronization burst is transmitted in a timeslot in each multi-frame such that the synchronization burst is a part of a timeslot hopping pattern provided by the sequence of n timeslots in the multi-frame.

13. The method of claim 1, wherein the radio communication system includes a plurality of base stations divided into at least two time groups, and the step of transmitting a synchronization burst in each frame includes transmitting from the base stations in each time group, a synchronization burst that indicates to the mobile stations in the system, a sequence by which the timeslot that includes the broadcast and common control information will change over a plurality of transmitted frames, wherein the sequence in each time group is the same as the sequence in other time groups, but offset from the sequence in other time groups by at least one timeslot.

14. In a radio communications system employing time reuse on broadcast and common control channels, wherein different base stations transmit broadcast and common control transmissions in different timeslots, a method of enabling a mobile station in the system to make measurements, in a single timeslot, of the broadcast and common control channel transmissions from at least two base stations in the system, comprising the steps of:

transmitting a downlink broadcast or common control channel, from a first base station, during a first portion of a first timeslot, and during a subsequent portion of a second timeslot;

transmitting a downlink broadcast or common control channel, from a second base station, during a first portion of the second timeslot and during a subsequent portion of a third timeslot;

measuring the transmissions from the second base station, at the mobile station, during at least a part of the first portion of the second timeslot; and measuring the transmissions from the first base station, at the mobile station, during at least a part of the subsequent portion of the second timeslot.

15. The method of claim 14, wherein a base station transmits a dummy burst during a portion of the second timeslot, the dummy burst being transmitted at a power level equal to a power level used by the base station in transmitting a broadcast or common control channel on the second timeslot.

16. A base station in a radio communications system employing time reuse for transmission of broadcast and common control information to mobile stations in the system, said base station comprising:

a controller that designates a sequence of timeslots in a sequence of associated frames, each designated timeslot in the sequence indicating the timeslot in each associated frame in which broadcast and common control information is to be transmitted to the mobile stations in the system, wherein the designated timeslot in each frame is different than the designated timeslot in the immediately receding frame;

means for transmitting the broadcast and common control information in the designated timeslot in each frame; and means for transmitting in each frame, a synchronization burst indicating to the mobile stations in the system, which timeslot in that frame includes the broadcast and common control information.

17. The base station of claim 16, wherein the sequence of associated frames occurs within a single block of four General Packet Radio Service (GPRS) downlink frames.

18. The base station of claim 16, wherein the designated sequence of timeslots is a sequence of n timeslots (n an integer greater than 1), and wherein an $m^{th}$ timeslot in the sequence, for every m in a range of 2 to n, is in a preceding timeslot position within its associated frame with respect to the position of an $(m-1)^{th}$ timeslot in the sequence.

19. The base station of claim 18, wherein the base station operates in a General Packet Radio Service (GPRS) network and transmits the broadcast and common control information on successive portions of a sequence of n timeslots in each of a succession of GPRS multi-frames.

20. The base station of claim 19, wherein the same sequence of n timeslots is used in every multi-frame.

21. The base station of claim 19, wherein the sequence of n timeslots changes from multi-frame to multi-frame.

22. The base station of claim 19, wherein the synchronization burst for a multi-frame is transmitted in a timeslot corresponding to the first timeslot in the sequence of n timeslots used in the multi-frame.

23. The base station of claim 19, wherein the synchronization burst for a multi-frame is transmitted in a timeslot corresponding to the first timeslot in the sequence of n timeslots used in a following multi-frame.

24. The base station of claim 19, wherein the synchronization burst is transmitted in the same timeslot in each multi-frame.

25. The base station of claim 19, wherein the synchronization burst is transmitted in a timeslot in each multi-frame such that the synchronization burst is a part of a timeslot hopping pattern provided by the sequence of n timeslots in the multi-frame.

26. A radio communications system employing time reuse on broadcast and common control channels, comprising:

a first base station transmitting a downlink broadcast or common control channel during a first portion of a first timeslot and during a subsequent portion of a second timeslot;

a second base station transmitting a downlink broadcast or common control channel during a first portion of the second timeslot and during a subsequent portion of a third timeslot; and a mobile station measuring the transmissions from the second base station during at least a part of the first portion of the second timeslot and measuring the transmissions from the first base station during at least a part of the subsequent portion of the second timeslot.

27. The system of claim 26, wherein a base station transmits a dummy burst during a portion of the second timeslot, the dummy burst being transmitted at a power level equal to a power level used by the base station in transmitting a broadcast or common control channel on the second timeslot.

28. In a radio communications system employing time reuse for transmission of at least one logical channel, a method of transmitting common control information from a mobile station to a base station in a first time group in the system, said method comprising the steps of:

receiving by the mobile station, a synchronization burst transmitted by the base station, said synchronization burst indicating to the mobile station, which timeslot in each frame is designated to include the common control information;

transmitting by the mobile station, the common control information in a first timeslot in a first frame, said first timeslot being the timeslot in the first frame designated to include the common control information; and transmitting the common control information in a second timeslot in a second frame, said second timeslot being the timeslot in the second frame designated to include the common control information, and said second designated timeslot having a different position in the second frame than the position of the first designated timeslot in the first frame.

29. The method of claim 28, wherein the second timeslot is in a preceding position within the second frame with respect to the position of the first timeslot within the first frame.

* * * * *